(12) United States Patent
Visuri et al.

(10) Patent No.: US 9,549,082 B2
(45) Date of Patent: Jan. 17, 2017

(54) SYSTEMS AND METHODS FOR MANAGING OFFLOAD FROM ONE RADIO ACCESS NETWORK TO ANOTHER

(71) Applicant: BandwidthX Inc., Carlsbad, CA (US)

(72) Inventors: Pertti Juhani Visuri, Fallbrook, CA (US); Randy Salo, San Diego, CA (US); Christian Van Hamersveld, San Diego, CA (US); Johanna Katariina Visuri, Solana Beach, CA (US); Dan Zagursky, San Diego, CA (US)

(73) Assignee: BANDWIDTHX INC., Carlsbad, CA (US)

( * ) Notice: Subject to any disclaimer, the term of this patent is extended or adjusted under 35 U.S.C. 154(b) by 81 days.

(21) Appl. No.: 14/586,837

(22) Filed: Dec. 30, 2014

(65) Prior Publication Data

US 2015/0189569 A1 Jul. 2, 2015

Related U.S. Application Data

(60) Provisional application No. 61/922,396, filed on Dec. 31, 2013, provisional application No. 61/922,382, (Continued)

(51) Int. Cl.
| | |
|---|---|
| *H04J 1/16* | (2006.01) |
| *H04W 4/00* | (2009.01) |
| *H04M 15/00* | (2006.01) |
| *H04W 36/22* | (2009.01) |
| *H04W 36/14* | (2009.01) |
| *H04W 16/00* | (2009.01) |
| *H04W 48/18* | (2009.01) |

(52) U.S. Cl.
CPC ............ *H04M 15/80* (2013.01); *H04W 16/00* (2013.01); *H04W 36/14* (2013.01); *H04W 36/22* (2013.01); *H04M 15/49* (2013.01); *H04M 15/50* (2013.01); *H04W 48/18* (2013.01)

(58) Field of Classification Search
CPC .. H04W 36/22; H04W 28/08; H04W 52/0254; H04W 52/0284
See application file for complete search history.

(56) References Cited

U.S. PATENT DOCUMENTS

| 5,426,674 A | 6/1995 | Nemirovsky et al. |
| 6,396,816 B1 | 5/2002 | Astle |
| (Continued) | | |

FOREIGN PATENT DOCUMENTS

WO 2013/044958 A1 4/2013

OTHER PUBLICATIONS

International Search Report and Written Opinion for related PCT Application No. PCT/US2014/072863, mailed on Apr. 24, 2015, in 11 pages.

(Continued)

*Primary Examiner* — Melanie Jagannathan
(74) *Attorney, Agent, or Firm* — Procopio, Cory, Hargreaves & Savitch LLP; Jonathan D. Cheng

(57) ABSTRACT

A method of managing data traffic offload from a radio access network may include: determining a location of a mobile device; and identifying, based on data traffic offload requirements of a network operator and capabilities of alternative network providers, one or more alternative networks configured to be accessed by the mobile device at the determined location.

16 Claims, 15 Drawing Sheets

Related U.S. Application Data filed on Dec. 31, 2013, provisional application No. 61/922,376, filed on Dec. 31, 2013.

(56) References Cited

U.S. PATENT DOCUMENTS

| | | | | |
|---|---|---|---|---|
| 8,743,696 | B2* | 6/2014 | Chowdhury | H04L 45/04 370/237 |
| 8,750,123 | B1* | 6/2014 | Alisawi | H04W 28/0284 370/231 |
| 9,001,787 | B1* | 4/2015 | Conant | H04W 36/04 370/328 |
| 9,110,661 | B2* | 8/2015 | Lynar | G06F 1/329 |
| 9,232,434 | B2* | 1/2016 | Rong | H04W 28/0289 |
| 9,325,621 | B1* | 4/2016 | Ramamurthy | H04W 28/08 |
| 2001/0032262 | A1 | 10/2001 | Sundqvist et al. | |
| 2004/0165605 | A1 | 8/2004 | Nassar | |
| 2004/0168088 | A1 | 8/2004 | Guo | |
| 2005/0278262 | A1 | 12/2005 | Cheliotis et al. | |
| 2007/0011080 | A1 | 1/2007 | Jain | |
| 2008/0015914 | A1 | 1/2008 | Jacobs et al. | |
| 2008/0279147 | A1 | 11/2008 | Hassan et al. | |
| 2009/0292629 | A1 | 11/2009 | Lynch et al. | |
| 2010/0145161 | A1 | 6/2010 | Niyato et al. | |
| 2011/0029675 | A1 | 2/2011 | Yeow | |
| 2011/0294539 | A1 | 12/2011 | Shin et al. | |
| 2012/0142382 | A1 | 6/2012 | Stanforth et al. | |
| 2012/0230191 | A1* | 9/2012 | Fang | H04W 36/22 370/235 |
| 2012/0238287 | A1 | 9/2012 | Scherzer | |
| 2012/0303788 | A1 | 11/2012 | Heinrich | |
| 2013/0070594 | A1 | 3/2013 | Garcia Martin et al. | |
| 2013/0089056 | A1 | 4/2013 | Iwai et al. | |
| 2013/0176952 | A1 | 7/2013 | Shin | |
| 2013/0301609 | A1 | 11/2013 | Smith et al. | |
| 2013/0311778 | A1* | 11/2013 | Cherukuri | H04L 63/0272 713/171 |
| 2013/0324104 | A1* | 12/2013 | Cavilla | H04W 72/1242 455/422.1 |
| 2014/0341109 | A1* | 11/2014 | Cartmell | H04L 45/308 370/328 |

OTHER PUBLICATIONS

International Search Report and Written Opinion for related PCT Application No. PCT/US2014/072864, mailed on Apr. 13, 2015, in 14 pages.

International Search Report and Written Opinion for related PCT Application No. PCT/US2014/073000 mailed on Apr. 21, 2015, in 12 pages.

* cited by examiner

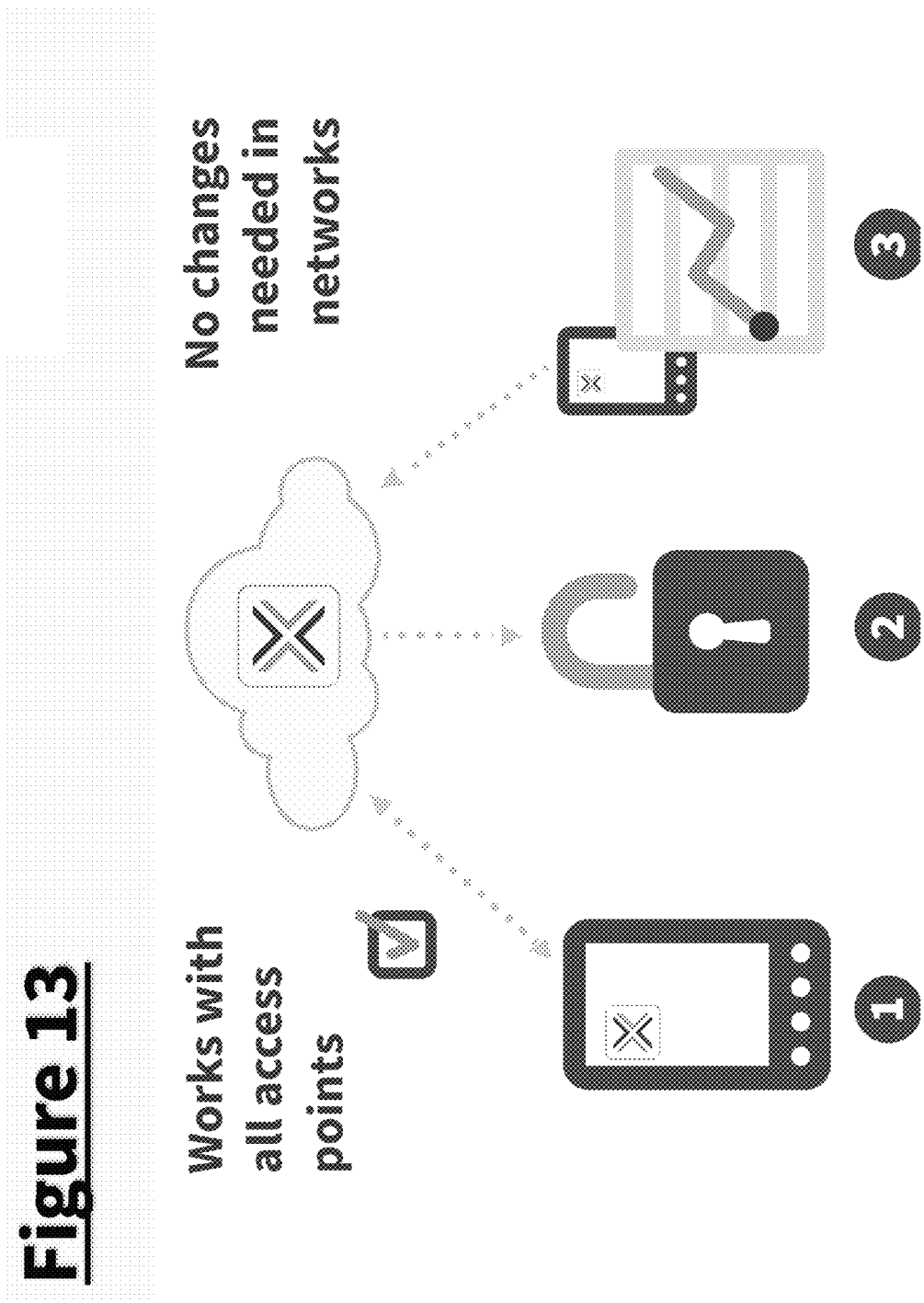

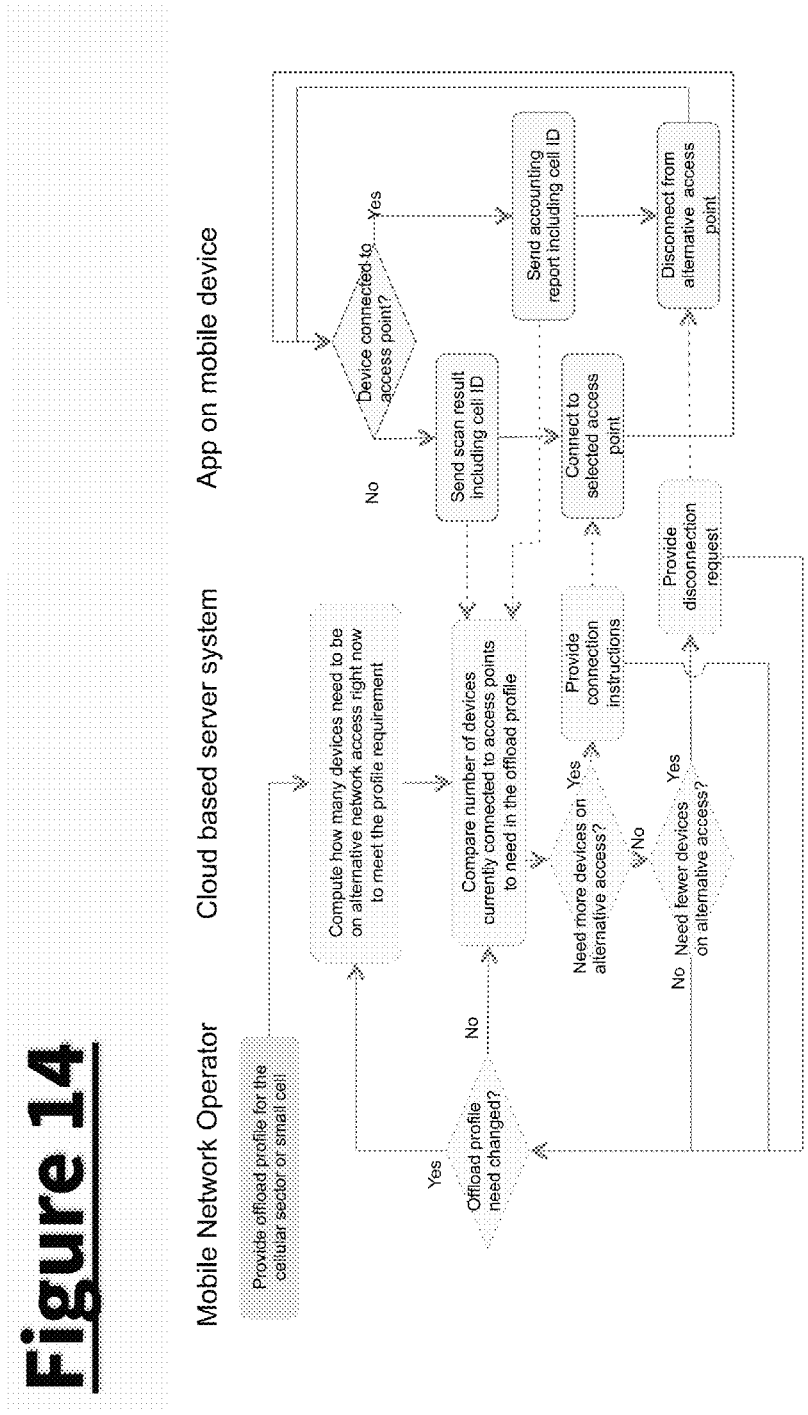

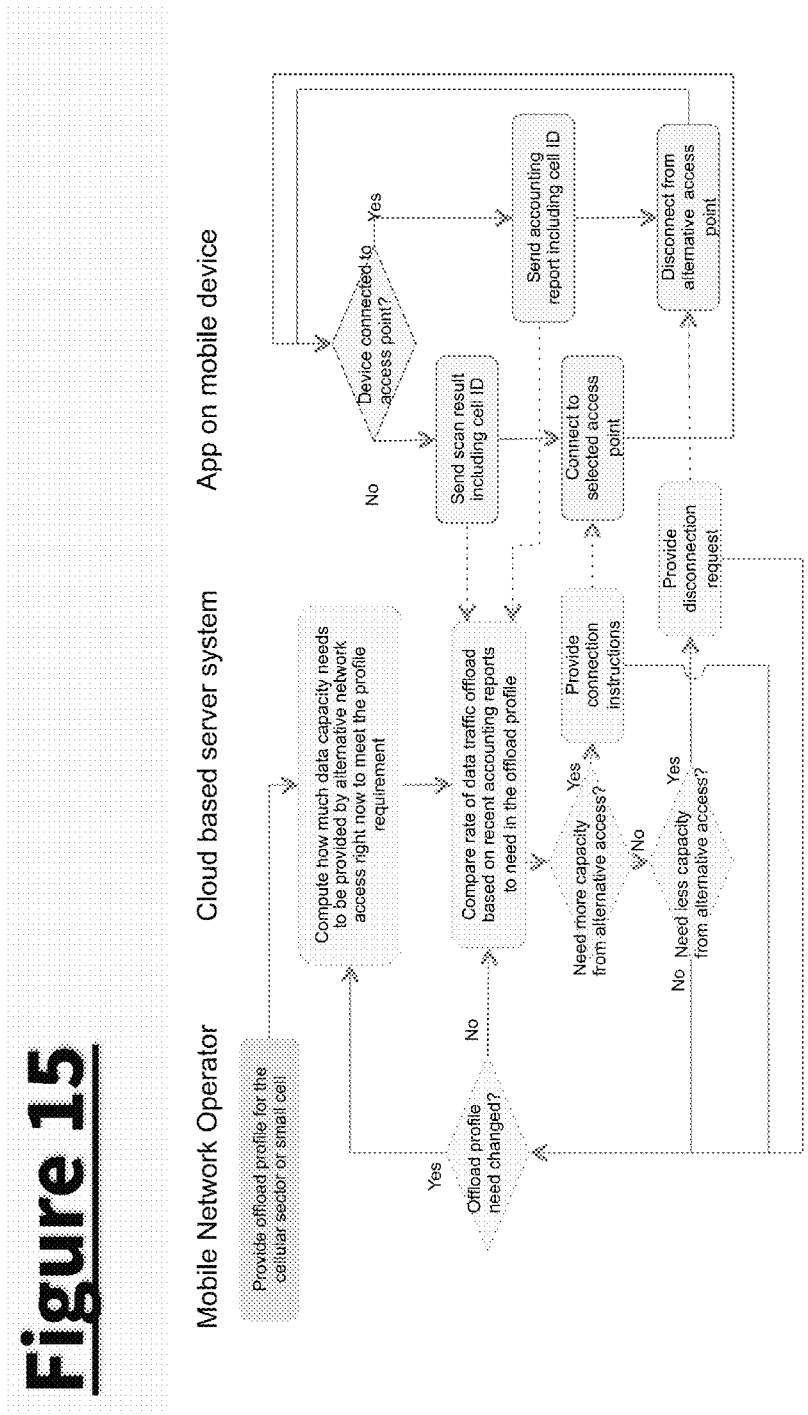

SYSTEMS AND METHODS FOR MANAGING OFFLOAD FROM ONE RADIO ACCESS NETWORK TO ANOTHER

CROSS-REFERENCE TO RELATED APPLICATION(S)

This application claims the benefit of U.S. Provisional Application No. 61/922,396, filed Dec. 31, 2013 and U.S. Provisional Application No. 61/922,382, filed Dec. 31, 2013, and U.S. Provisional Application No. 61/922,376, filed Dec. 31, 2013, the disclosures of which are incorporated herein in their entireties by reference.

BACKGROUND

Field

The subject matter discussed herein relates generally to wireless service to mobile devices and, more particularly, to managing the traffic on radio access networks that can be used to service mobile devices.

Related Art

Mobile devices generally rely on wireless service provided by a service provider using cellular communications that utilize radio frequency communication.

Data communications to mobile devices can also be provided over other types of radio access networks. For example, Wi-Fi access points connected to broadband networks provide data to mobile devices. The choice of whether data communication takes place over a cellular network or a Wi-Fi connection is normally left to the end user of the device. If the end user has entered all necessary passwords and access credentials to the mobile device memory and the Wi-Fi radio is on, in many cases the connection to Wi-Fi is preferred automatically by the mobile device.

In U.S. patent application Ser. No. 13/684,044 (filed Nov. 21, 2012), Ser. No. 13/684,048 (filed Nov. 21, 2012), Ser. No. 13/684,049 (filed Nov. 21, 2012), 61/805,473 (filed Mar. 26, 2012), 61/805,476 (filed Mar. 26, 2012) and 61/877,178 (filed Sep. 12, 2013) methods are described for alternative network access (ANA) based on methods and systems for selecting the radio access network to provide Internet or other network access based on terms and conditions for allowing access and terms and conditions for utilizing access to the alternative network. Each of those applications is hereby incorporated by reference in their entirety.

In practice, the terms and conditions for utilizing access to alternative networks often depend on the expected or the actual load on the primary network managed by the service provider for the device. For example, if the primary network access takes place through the cellular network system owned by the service provider for the device, it is likely that the service provider first wants to utilize all of the capacity in its own network before seeking to use capacity from an alternative network. This is especially the case if there is a cost associated with using the alternative network access.

BRIEF DESCRIPTION OF THE DRAWINGS

Aspects and features of the present inventive concept will be more apparent by describing example embodiments with reference to the accompanying drawings, in which:

FIG. 13 illustrates an example of the operations in authentication and authorization for managing data traffic offload to an alternative network according to various embodiments;

FIG. 14 is a functional flow diagram of an example process of managing the appropriate amount of data traffic offload from the primary to the alternative network according to various embodiments; and FIG. 15 is a functional flow diagram of an example process for managing data traffic offload in case the profile is defined in terms of data capacity need from alternative network access according to various embodiments.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for establishing wireless connections based on access conditions. Other features and advantages of the subject matter should be apparent from the following description.

As communication needs of various wireless and mobile devices have grown, many of them have been equipped with more than one radio system. Each of the radio systems may be used to connect to one or more wireless networks based on the system protocols. Examples of such systems are a cellular radio system that may be utilizing a GSM, CDMA or LTE standard for encoding the signal and a Wi-Fi system that utilizes a well-known IEEE 802.11 standard for communication. Another example may be a WiMAX system that is based on the IEEE standard 802.16.

Structure and Operational Characteristics of Cellular and Wi-Fi Networks

In a communication device that has multiple radio systems, each of the radios may have different characteristics.

For example, the cellular system may be designed to connect to cell towers that are further apart and use a higher power signal than the Wi-Fi radio system uses. Since the Wi-Fi standard is utilizing unlicensed spectrum, the power of the transmitter may be limited by regulation and consequently the distance over which the communication can effectively take place may be shorter than the effective communication distance in the case of a cellular connection.

The different characteristic of the radio systems may result in a topology of coverage in the environment that is very different for each radio access network. For example, in the cellular system a single radio may be covering an area ranging from hundreds of meters across to a few kilometers, with typically one square kilometer or more of surface area for a cellular sector. In comparison, a Wi-Fi system that is based on using unlicensed radio bands and therefore limited in the power of the signal may cover only an area of 50 meters to 100 meters across.

Figure 1:
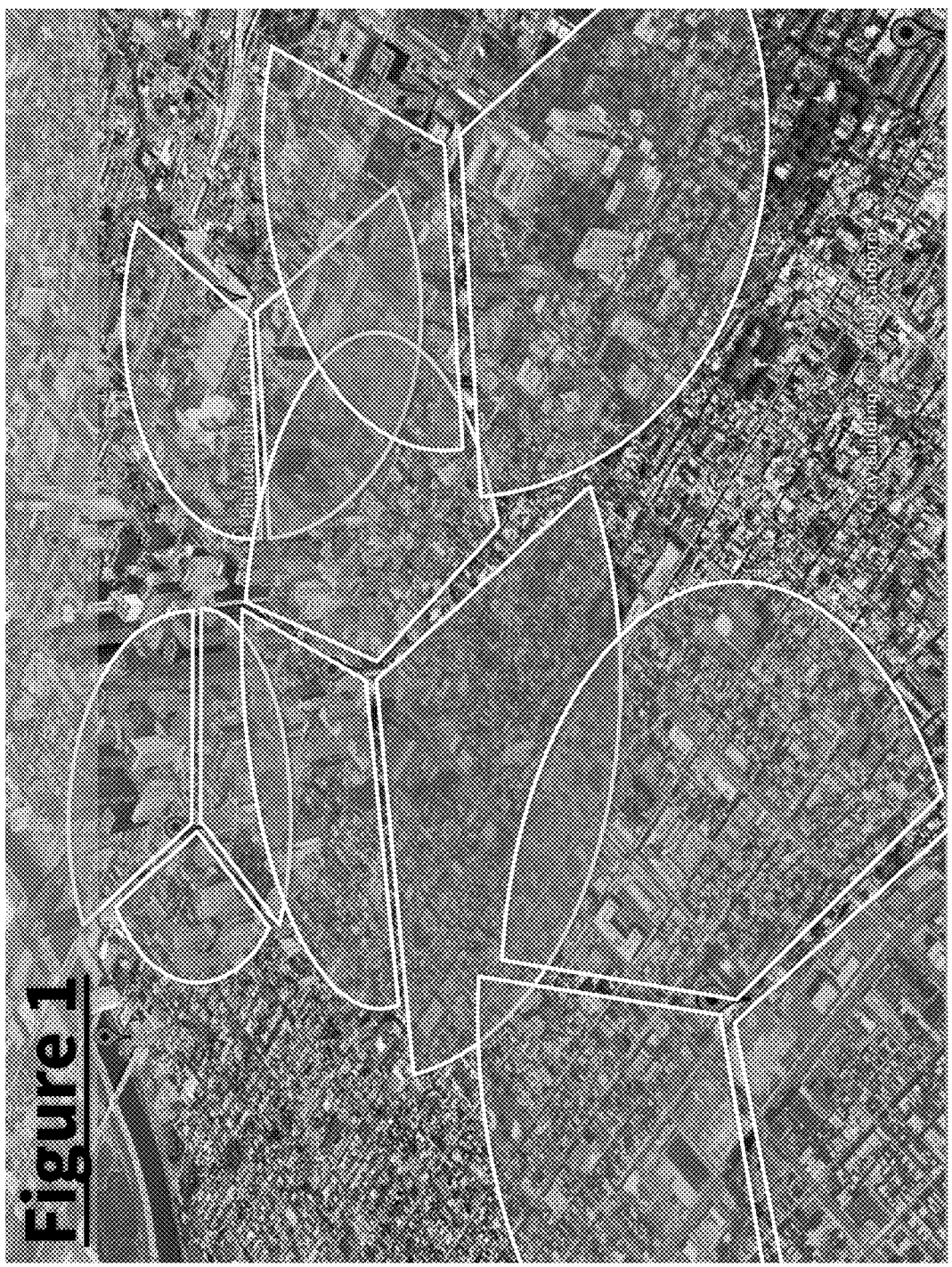
FIG. 1 is an illustration of a conventional layout of cellular sectors in an urban environment.

A cellular radio access network is normally engineered for ubiquitous coverage. This means that cell sites are placed at distances where the coverage of each sector slightly overlaps with the coverage area of the adjacent sector. FIG. 1 is an illustration of a conventional layout of cellular sectors in an urban environment. This is a simplification of the actual situation in many cellular access networks. Often, in addition to macro cell sites and their associated sectors, there may be small cells with shorter range. These shorter range cells may also have sectored radio systems. However, in the aggregate, cellular systems are engineered for ubiquitous coverage.

Figure 2:
FIG. 2 illustrates locations of Wi-Fi access points in the urban environment illustrated in FIG. 1.

Wi-Fi access points are typically deployed to meet the needs of the subscriber to the broadband connection to which the access point is connected. There are also Wi-Fi access point deployments that are intended for third parties or the general public. These are often called hotspots. In either case, the Wi-Fi access points that may be available for offloading data traffic are located in various places throughout the environment and their coverage may or may not be ubiquitous. These access points may constitute the example alternative network access discussed in this document. FIG. 2 illustrates locations of Wi-Fi access points in the urban environment illustrated in FIG. 1.

Figure 3:
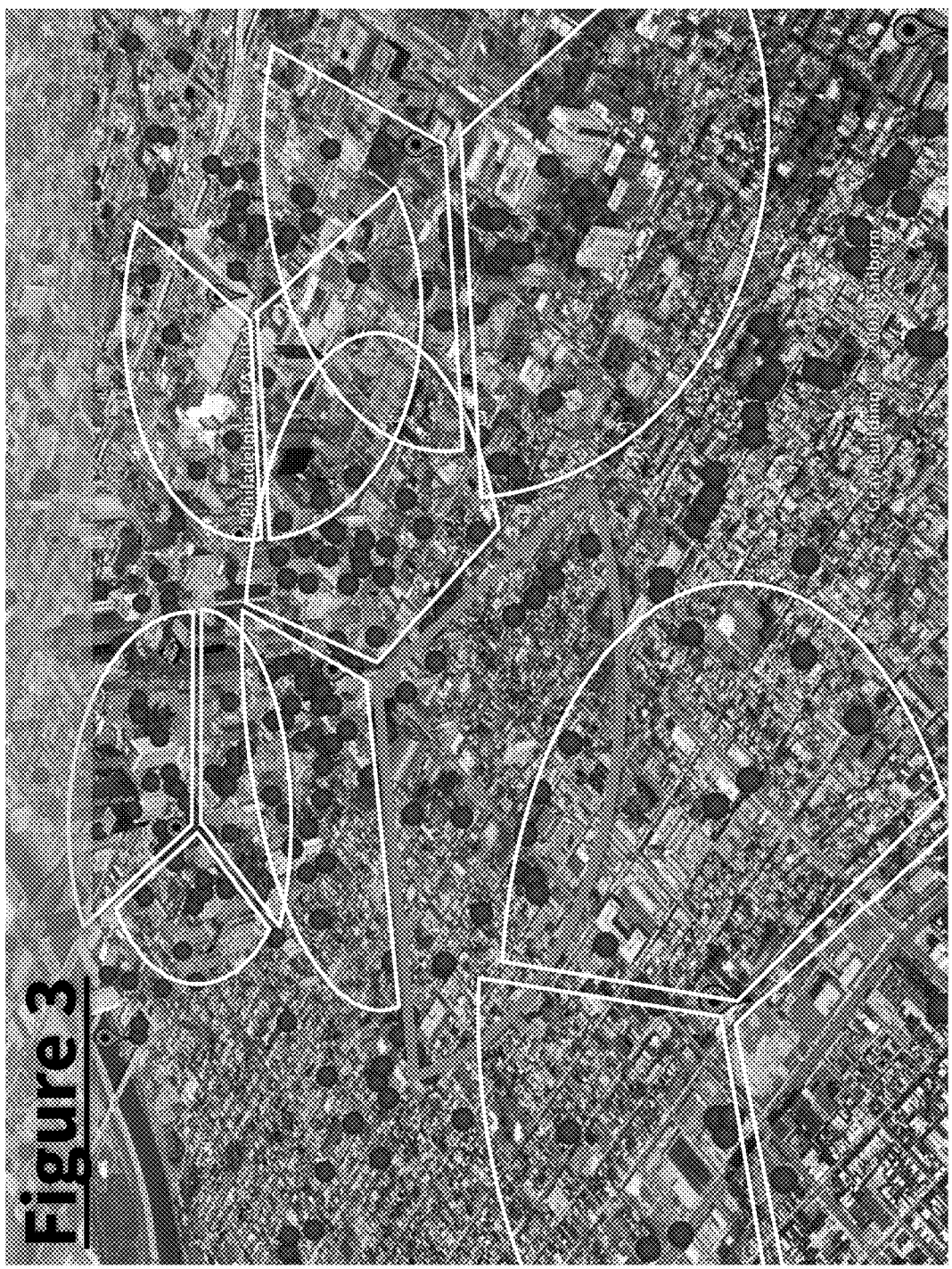
FIG. 3 illustrates an example of how conventional cellular sectors and Wi-Fi access point locations are related to one another.

Typically there are several access points that can provide alternative network access within the area of each cellular sector. An example of the distribution of Wi-Fi access points (represented by the dark circles) in an urban environment is shown in FIG. 2. FIG. 3 illustrates an example of how conventional cellular sectors and Wi-Fi access point locations are related to one another.

Figure 4:
FIG. 4 illustrates a density of access points in an urban environment based on a field test result.
Figure 5:
FIG. 5 is a closer view of a density of access points in an urban environment based on a field test result.

It may be noted that, in most urban environments with reasonable penetration of broadband connections, the Wi-Fi access points in the aggregate provide signals that are sufficient to provide much more than ubiquitous coverage. In fact, in most urban environments a mobile device with Wi-Fi access typically receives a strong enough signal for good broadband connection from several, in many cases from dozens of Wi-Fi access points. However, all of these access points may not be available for alternative network access. FIG. 4 illustrates a density of access points in an urban environment based on a field test result. FIG. 5 is a closer view of a density of access points in an urban environment based on a field test result. In FIGS. 4 and 5, the density of access points and Wi-Fi signals in the urban environment are represented by the spheres.

Not only are Wi-Fi access point signals ubiquitous in many environments, they are also most of the time not being used. The nature of the need for accessing the Internet is typically quite intermittent. However, at the time of the access is required, it is desirable to have high data transfer speeds available. Because of the desired high data transfer speeds, most broadband connections are capable of speeds of several megabits per second. The typical average speeds are also growing rapidly as further investments into more sophisticated data transfer systems are made by the broadband service providers.

The end result of the relatively high penetration of broadband access, high prevalence of Wi-Fi access points in the termination points on broadband connections, and the intermittent use of these Internet connections is that there is tremendous unused wireless network access capacity available in most urban and suburban areas. This capacity is owned and controlled by broadband service providers. In most cases these broadband service providers are different companies than the mobile network operators. Therefore, in most cases the access points are not available for alternative network access to the mobile devices that primarily use cellular networks for accessing the Internet.

Figure 6:
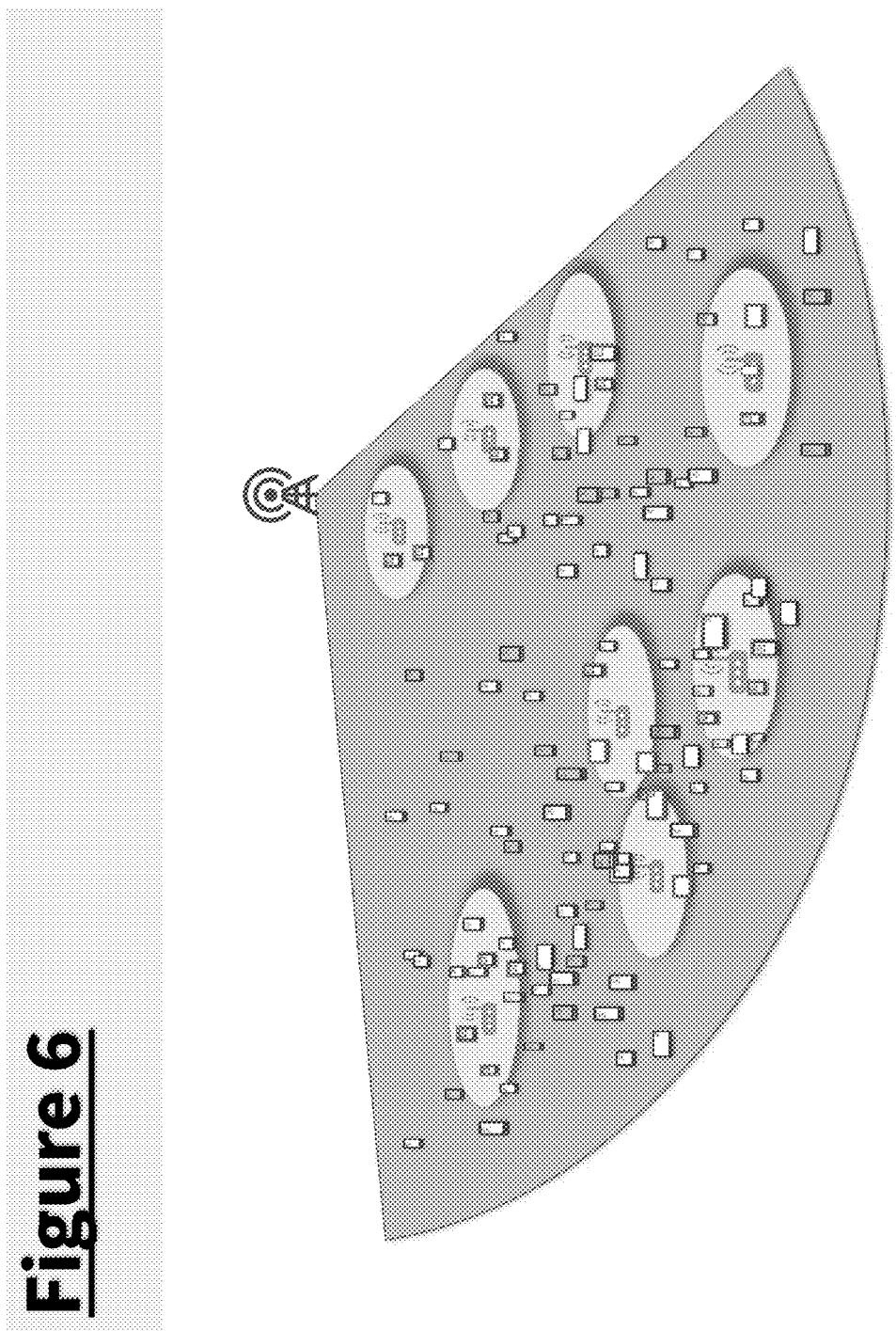
FIG. 6 illustrates a schematic example of how mobile devices are distributed within a cellular sector according to various embodiments.

Mobile devices may be anywhere in the environment and are, true to their name, moving around in relation to the stationary radio access networks as their end-users move during the course of the day. At any given time a typical cellular macro sector may serve several hundred mobile devices. Only a small portion of these mobile devices is active and an even smaller portion may be downloading or uploading data at any given instant. FIG. 6 illustrates a schematic example of how mobile devices are distributed within a cellular sector. Some mobile devices are within range of selected Wi-Fi access points (represented as ovals with an access point graphically represented near their center); others are not within range of Wi-Fi access points.

As the overall usage of data by mobile devices continues to grow, more devices, connected to a particular cell sector radio will attempt to use more data at higher frequencies. Over time, this means that the maximum capacity of data traffic at the cellular radio will be reached. Initially, this may happen only during peak usage times. These peak times are typically very regular and occur during business days during the same hours every day. The actual pattern of usage may be different at different locations. For example, in downtown business districts the peak usage may take place during the morning and evening commute hours and during lunchtime. In suburban residential areas, the highest usage normally occurs during the evening hours.

Figure 7:
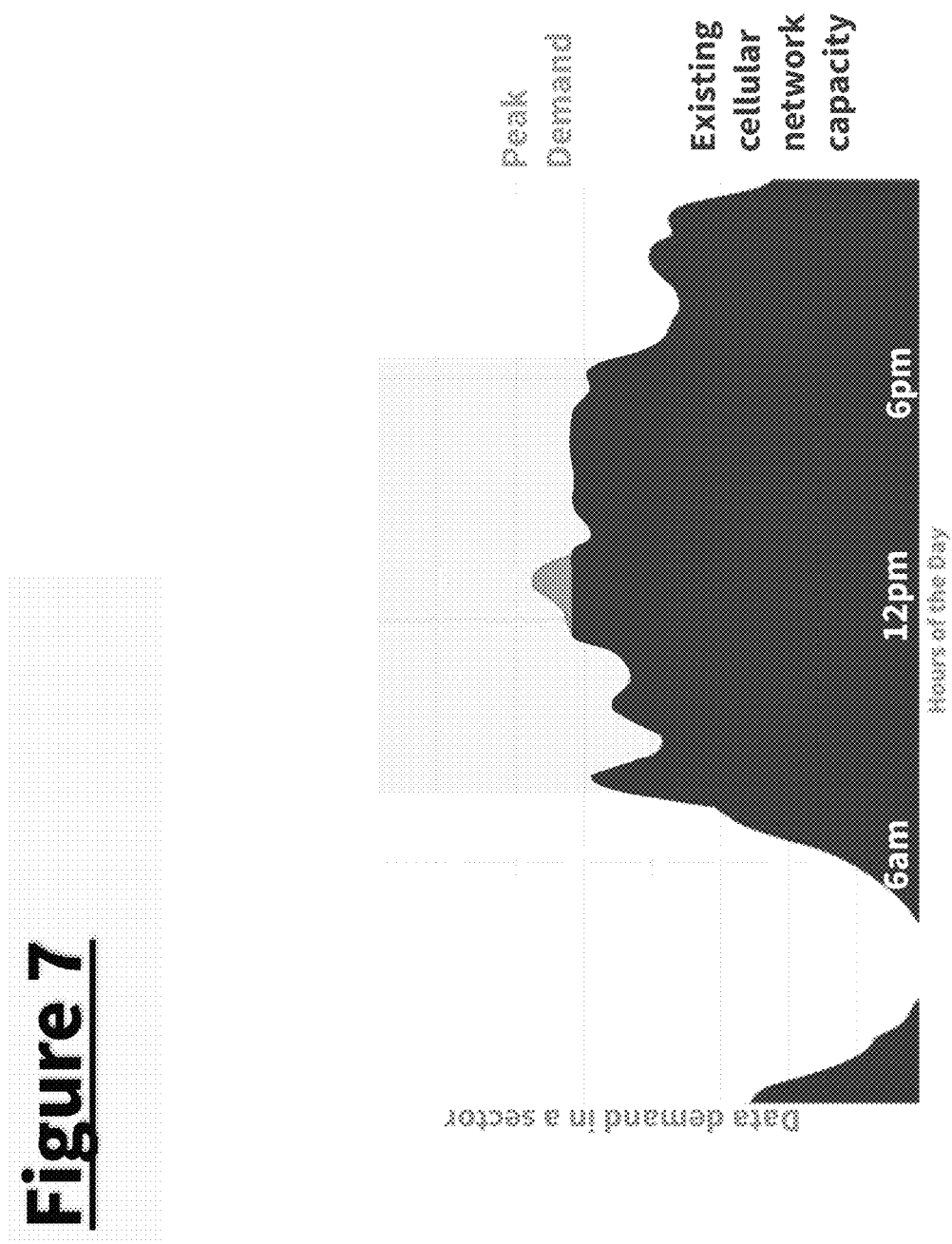
FIG. 7 illustrates a typical variation of data usage during the hours of a day in a cellular sector during business days in a downtown business district according to various embodiments.

FIG. 7 illustrates a typical variation of data usage in a cellular sector during the hours of a business day in a downtown business district. The light gray area represents demand that is beyond the existing cellular network capacity. Because of the variation of usage during different hours of the day, the gradually increasing demand in each cellular sector or small cell initially exceeds capacity only during a relatively short period at the peak demand time. An example of such peak demand exceeding the cellular network capacity is shown in FIG. 7.

Figure 8:
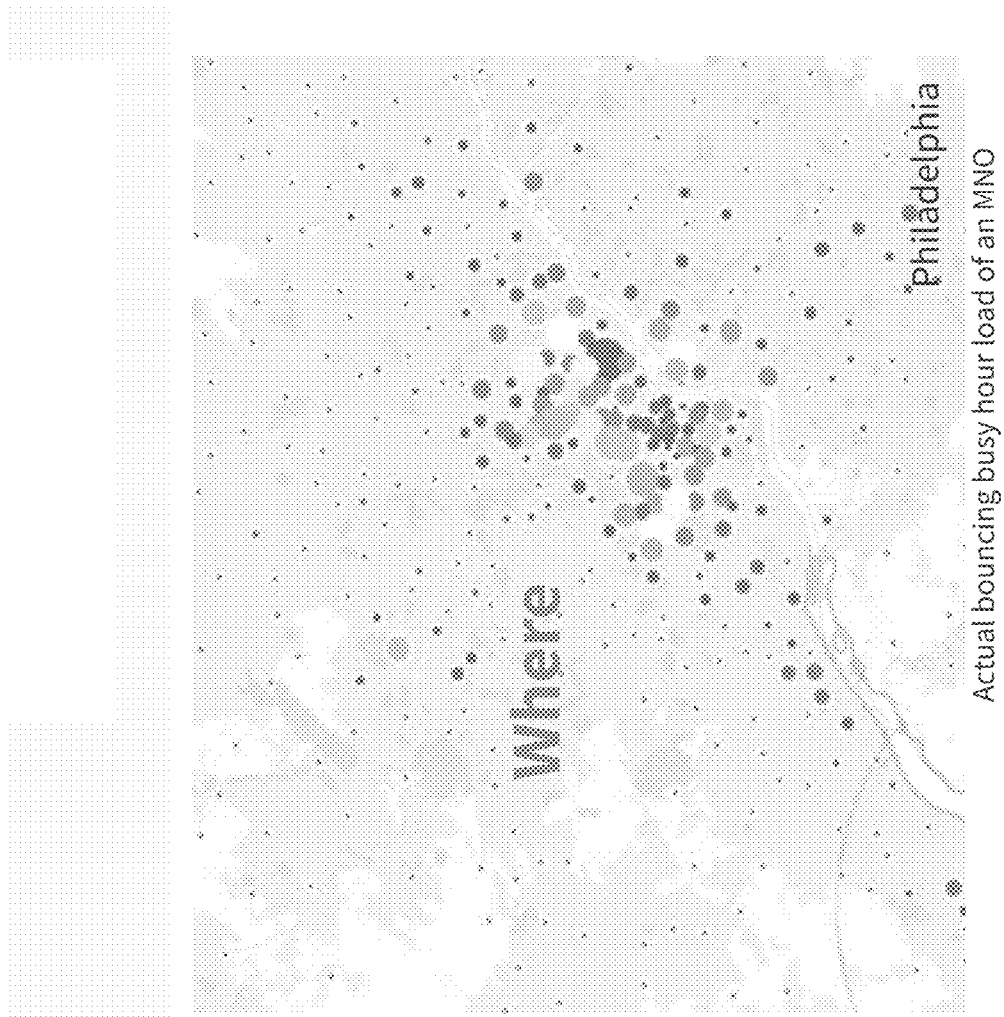
FIG. 8 is an illustration of an example of a non-uniformity of data demand across several towers of a single mobile network operator in and around an urban area.

The cellular network system of a mobile network operator typically includes thousands, perhaps tens of thousands of cellular sectors and small cells. The distribution of data demand is typically quite uneven across the various cell sites and cellular sectors. FIG. 8 is an illustration of an example of the non-uniformity of data demand across several towers of a single mobile network operator in and around an urban area. The size of the dots (small circles) indicates the total data traffic during the busiest hour of the day at each cell site.

As can be seen from the dots, at the time of the measurement only a few cell sites had very high demand (the largest dots) and would have benefited from additional capacity. During normal operation, typically only a few percent of the cell sites are in need of additional capacity. Mobile network operators normally address the capacity shortages by investing in additional equipment, taking on rental costs, and paying for additional backhaul for routing the traffic to the Internet or the cellular operator's network system. By always expanding capacity at the locations most in need of expansion the operators keep up with demand. As a result, those are the locations where additional capacity would need to be shifted around in the network.

Figure 9:
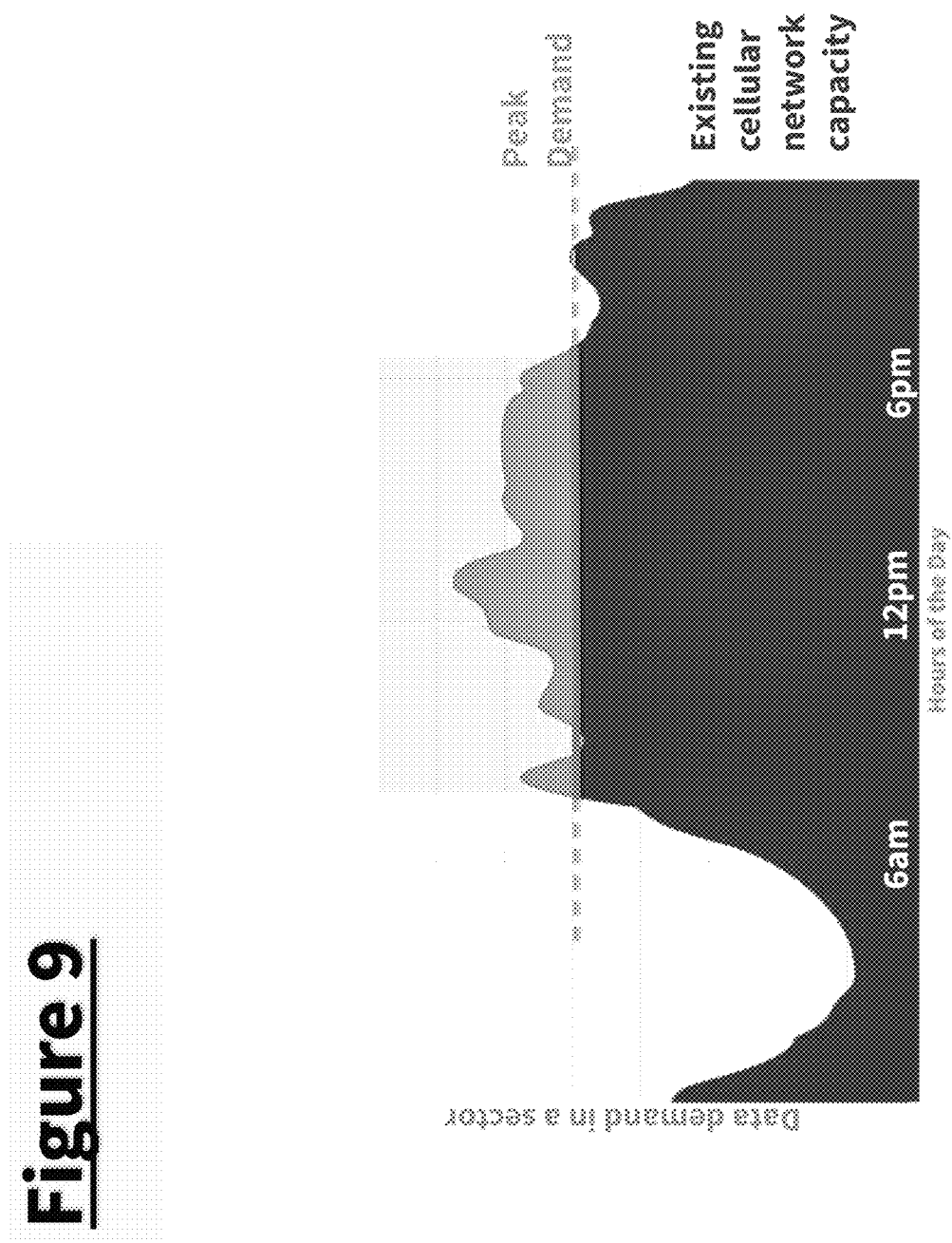
FIG. 9 is an illustration of the projected data traffic load during the hours of a day in the sector depicted in FIG. 7 six months later than the situation in FIG. 7.

FIG. 9 is an illustration of the projected data traffic load during the hours of a day in the sector depicted in FIG. 7 six months later than the situation in FIG. 7. Cellular network operators accumulate large amounts of information of usage patterns in their networks. This information is normally used to plan for network expansions in order to keep up with the growing demand. For example, by analyzing the collected information about use of cellular data in a particular sector represented by FIG. 7 and applying straightforward trend extrapolation and other forecasting methods, a cellular operator may conclude that within six months data usage in the same sector will look like a pattern shown in FIG. 9. Again, the light gray area represents demand that is beyond the existing cellular network capacity.

Assuming that the network operator has not increased the capacity of the cellular network, it would be desirable for the mobile network operator to gain access to alternative network capacity for mobile devices within this cellular sector to make up for the shortfall in capacity.

Figure 10:
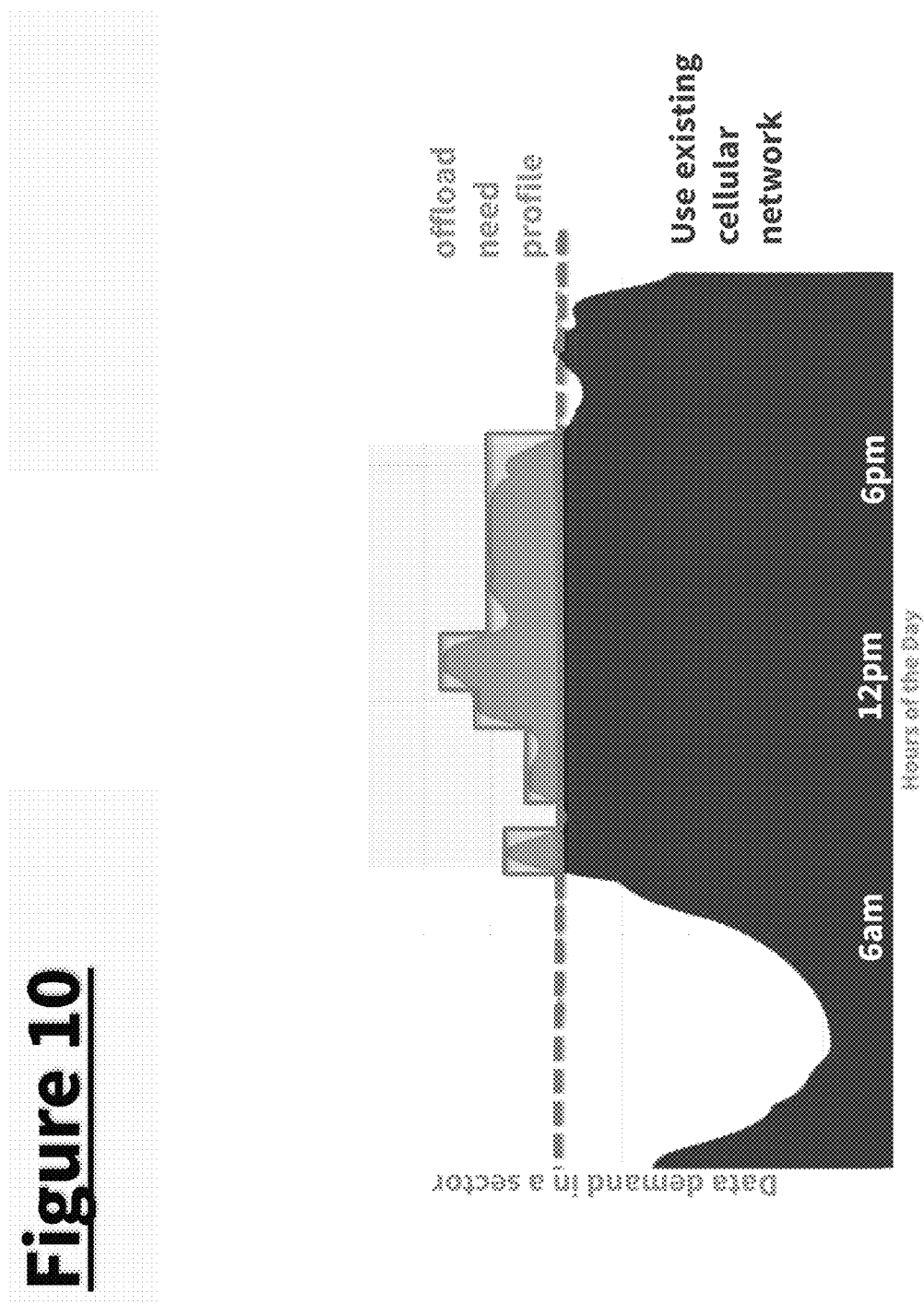
FIG. 10 illustrates the anticipated hourly data traffic offload need profile of the mobile network operator in case of the projected load illustrated in FIG. 9.

In most cases, the need for alternative network capacity in each sector would vary by the hours of the day. In an ideal case, the mobile network operator would offload data traffic during each hour (or other shorter time period) of the day exactly in the amount needed to make up the difference between the existing cellular network capacity and the data capacity demand during each hour. FIG. 10 illustrates the anticipated hourly data traffic offload need profile of the mobile network operator in case of the projected load illustrated in FIG. 9.

The following system description explains a method and system to enable managing data traffic offload to an alternative network in order to achieve the offload profile described in the previous paragraph.

Method and System for Managing Data Traffic Offload

An example of a solution for managing data traffic offload to meet the objectives of the mobile network operator can determine which network access each of the mobile devices uses at various times. The parameters for this determination are quite complex and dynamic.

Certain access points for alternative network access may be located within a particular cellular sector or small cell; however, there may be overlap between cellular sectors. For example, a Wi-Fi access point in some cases may be within the footprint of several cell sectors. Adding small cells into the mix further complicates the task of determining to which cellular radio systems specific Wi-Fi access points may provide alternative network access. In addition the mobile operators have deployed network load management systems, which dynamically allocate mobile devices to various cellular radio connections to balance network traffic.

Because mobile devices move around in the environment, the available choices of network access for each of the devices may vary over time. In addition each of the mobile devices may need data capacity at different times depending on their use. In various embodiments, to deal with the complexity and dynamic nature of the need for alternative network access, the solution for managing data traffic offload to alternative access may consist of, for example, but not limited to, three kinds of components:

1) A software module (for example, an application) operating on each of the mobile devices participating in the system;

2) A cloud-based server system including software that communicates with the application on their mobile devices; and.

3) Interfaces for mobile network operators and for providers of alternative network access to enter information about their needs and about their willingness to provide alternative network access and the terms and conditions associated with such access.

Figure 11:
FIG. 11 illustrates an example of the components of an exemplary system for managing data traffic offload to alternative network access points according to various embodiments.
Figure 12:
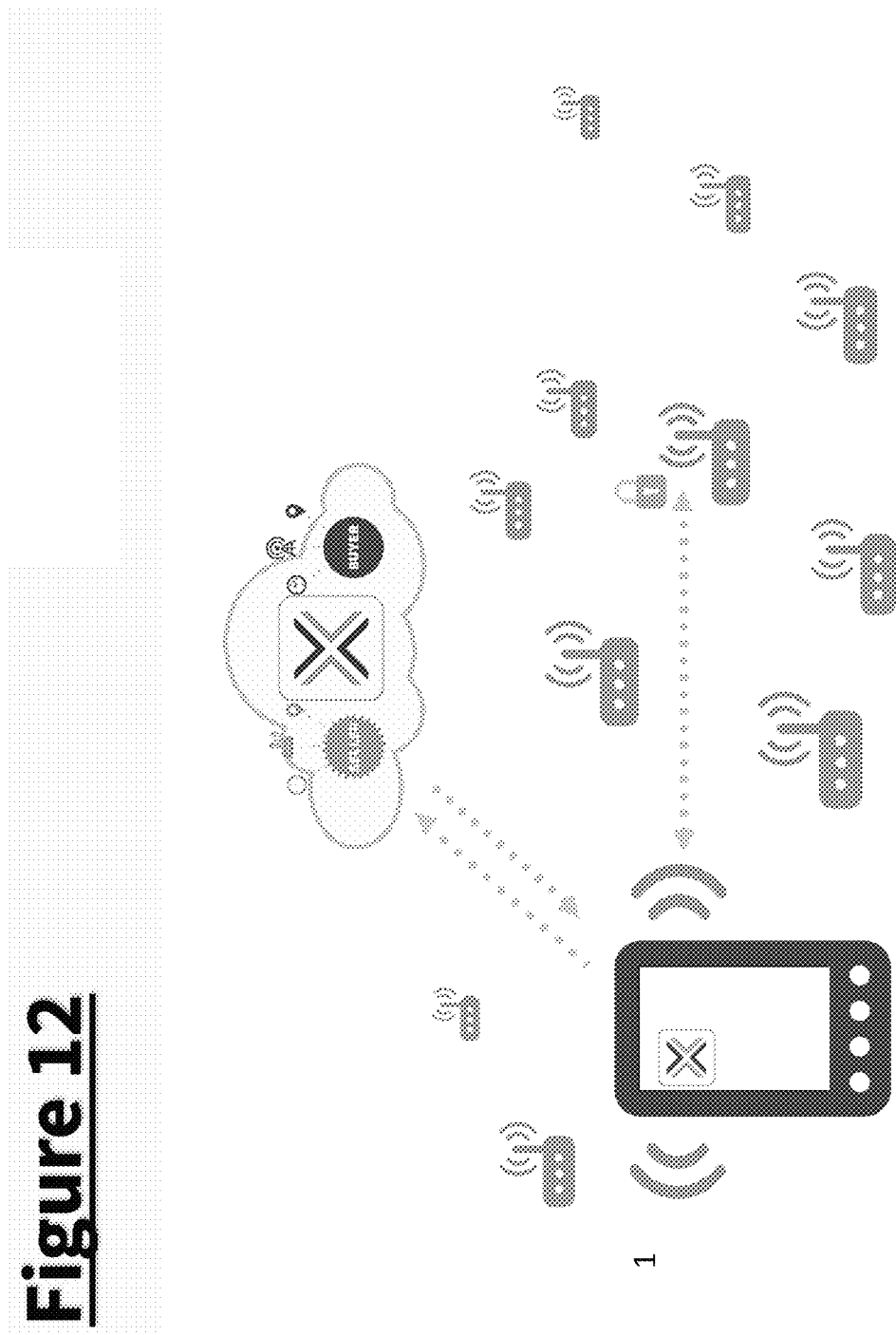
FIG. 12 illustrates an example of the process of determining to which access point a particular mobile device shall connect during the operation of data communication according to various embodiments.

FIG. 11 illustrates an example of the components of an exemplary system for managing data traffic offload to alternative network access points according to various embodiments. FIG. 12 illustrates an example of the process of determining to which access point a particular mobile device shall connect during the operation of data communication according to various embodiments.

The functioning of all the components as a system for managing data traffic offload to alternative network access is illustrated in FIG. 12 and explained in the following. When the mobile device is in sleep mode and there is no Internet access available through a Wi-Fi connection, the application on the mobile device may turn the Wi-Fi radio off in order to conserve battery power. If the user of the mobile device activates the mobile device so that it comes out of the sleep mode, the application may turn on the Wi-Fi radio and scan for available Wi-Fi access points in its environment. For example, the application may immediately turn on the Wi-Fi radio and scan Wi-Fi access points when the mobile device comes out of the sleep mode. Even during sleep mode the application may turn on the Wi-Fi radio and scan for available access points at predetermined intervals.

The results of the scan, including the signal strength of each access point, are transmitted to the cloud-based server system. Information about the identification of the cellular sector to which the mobile device is connected as well as the latitude and longitude of the mobile device at the time of the scan may be included in the scan information.

The server may utilize information in the scan about the observed access points, the signal strengths of the observed access points, the identification of the cell sector to which the mobile device is connected together with information provided by the mobile network operator and information about the owner of the access points that may provide alternative network access. Based on all this information, the server determines whether the mobile device should transfer its connection from the cellular network to one of the Wi-Fi access points that have a sufficiently strong signal as indicated by the scan results.

Based on a determination by the server, the server may send information to the mobile device that includes the identification of the access point to which the mobile device should associate (if any). The server may send a rank ordered list of access points that would be possible providers of alternative network access in order to provide several alternatives for the mobile device.

In most cases access to the Internet through Wi-Fi access points is controlled by some kind of security and access control system. Therefore the mobile device may need credentials and instructions about how to obtain access to the Internet. Terms and conditions for access set by the alternative network access provider may include payments that depend on the amount of data traffic. There may also be limits to how much data can be used in any session before re-authorization or termination of the session. Accordingly, there may also be a need to keep track of how much data traffic to the mobile device each access point provides.

FIG. 13 illustrates an example of the operations in authentication and authorization for managing data traffic offload to an alternative network according to various embodiments. Every communication between the app on the mobile device and the cloud-based server system may be encrypted and authenticated. There may be a shared secret between the two software systems (i.e., the application and the server) and the application may have access to the identification information of the mobile device and its service provider. The server system may further confirm the authorization status of the mobile device using standard protocols, for example, but not limited to, the RADIUS protocol. A connection to the RADIUS server system of the mobile network operator serving the mobile device may be made at whatever frequency mobile network operator has specified.

Once the authorization is confirmed and the server system has made the determination that the data connection of the mobile device should be transferred to a specific access point, the server system may send the required credentials and instructions on how to use the credentials to the application on the mobile device. The credentials may be in an encrypted form and only the application on the mobile device may receive the credentials and be able to decrypt and use them. The end user of the device may not have access to the credentials, and the operating system in the device may not retain any information about them after the connection is made. The mobile device uses the credentials to make the connection to (i.e., associate with) the access point.

The quality of the signal of the access point for alternative network access is monitored by the mobile device using an appropriate parameter, for example, but not limited to, the relative signal strength (RSSI), the encoding method selected by the mobile device and the access point, etc., or any other indicator of the ability of the signal to provide a good quality broadband connection. If the quality indicator is below a set threshold or drops below a set threshold during the connection the system automatically disassociates from the access point and transfers the connection to the primary cellular network access (e.g., cellular network access).

The availability of a connection to the Internet is also frequently monitored, for example by pinging a known server. The system may allow a set time interval for reaching the Internet at the beginning of a connection and a different time interval during the connection. Also, the access control system on the access point may cause the mobile device access to the Internet to expire. Upon expiration of access, the mobile device may again follow the access instructions from the server to extend the session. If the access instructions fail, the connection may be automatically terminated and/or control may be sent to the end use for the user to take specific action.

Other parameters may also be included in the monitoring and testing of the connection quality. For example, the system may be monitoring the latency of the connection. This may be done by pinging a specified server, for example, but not limited to, a voice over IP (VOIP) connection server.

Another signal quality test that the system may perform is a speed test for the connection. This may be done by passively monitoring the speed of the traffic that the device is generating in normal use. If the speed is of the passive test is not adequate, the system may perform an active speed test. In an active test several simultaneous download streams may be initiated from a single server or from multiple servers and speed may be monitored only during a part of the download process.

The action taken by the system based on the results of the various signal quality checks may include transferring the connection automatically to the primary network access (e.g., cellular network access) or informing the end user about the test result and letting the user decide on the specific action to take. For example, a high latency tests result may lead the system to recommend that the user selects conventional cellular voice connection instead of a VOIP call application for making a voice call.

Once the signal quality has been determined, assuming the mobile device is still using the alternative network access, the application on the mobile device may begin recording the data use of the mobile device. The number of bytes used may be recorded at regular intervals and/or at the end of each connection, and the usage results may be sent to the cloud based server system for billing and reconciliation purposes. The transfer of this information may be done at a later point to optimize performance of the system for cost and data speed. The information transfer may also be done within a specific time interval in order to help the system manage data traffic offload to the specific offload profile specified by the mobile network operator.

In various embodiments the key to managing the data traffic offload to alternative network access in order to achieve the ideal offload profile may be in how the server system utilizes the information provided to it by the mobile devices and the information about the need for data traffic offload and the availability of access points for data traffic offload.

For example, the mobile network operator may input (e.g., to the cloud based server system via a buyer console illustrated in FIG. 11) the desired offload profile for each cellular sector that, based on the analysis of usage data and its forecasts, will experience a shortage of capacity at specific hours of the day. This offload profile may be provided by the mobile network operator in advance (e.g., months in advance) as a part of the normal network planning process. The necessary data traffic offload capacity may be reserved for the operator by the alternative network access provider based on the offload profile. The mechanisms for allocating capacity and making such reservations are discussed in a separate document. In the following discussion, it is assumed that the desired offload profile is accepted by the offload management service provider and used as the target offload profile for managing alternative network access.

The offload profile may be in the form of specific data capacity (e.g., in Mbits/s) during various times, or it may be in the form of a specific number of active devices utilizing alternative network access at specific times.

Since the mobile network operator may input the offload profile individually for each cellular sector or small cell, the offload profile provides precise control for the operator about where in terms of the mobile network topology the alternative network access is utilized (see FIG. 8). Since the mobile network operator may specify at what times data traffic offload to alternative network access shall be used, the mechanism provides control about when data traffic offload is utilized (see FIGS. 7, 9, and 10).

As the need for additional capacity may vary during different hours of the day and between different days, the offload management system may also provide the ability to specify different amounts of data traffic offload for each sector at different times in the offload profile. This way, the mobile network operator can control how much alternative network access capacity is used in each cell sector at each time (see FIG. 10).

The cloud-based server system for managing data traffic offload may take the offload profiles specified by the mobile operators as an input for managing connections in each sector. From the communications of the scan results from mobile devices, the cloud-based server system knows how many mobile devices are connected to each cellular sector and which of the mobile devices are in active versus sleep mode. As indicated above, the scan results may include an identification of the cellular sector to which each mobile device is connected.

From the reports of the accounting function in the application on the mobile devices the cloud-based server system also knows how much data each of the mobile devices has consumed from the alternative network access points during a specified interval. The mobile devices may also report to the cloud-based server system the amount of cellular data they are consuming during the times when it is necessary to manage the data traffic offload to alternative network access to further assist in management of the data traffic offload. The reports of the accounting system may also include the identification of the cellular sector to which the device is connected.

Utilizing the information from the offload profile and the scan result reports and the feedback from the accounting reports the cloud-based server system can issue instructions to the appropriate number of mobile devices connected to each cellular sector to achieve the offload profile specified for each sector. These instructions may cause a mobile device to transfer its connection to alternative network access (e.g., for a specified amount of time or specified amount of data traffic) or cause a specific mobile device to transfer the data connection from alternative network access back to the primary network access (e.g., cellular network access) depending on the relation of the actual data traffic offloading to the specified offload profile.

FIG. 14 is a functional flow diagram of an example process of managing the appropriate amount of data traffic offload from the primary to the alternative network according to various embodiments. In FIG. 14 the headings above the flow diagram indicate which parts of the system can perform each step. FIG. 15 is a functional flow diagram of an example process for managing data traffic offload in case the profile is defined in terms of data capacity need from alternative network access according to various embodiments. Also, in FIG. 15 the headings above the flow diagram indicate which parts of the system can perform each step.

The foregoing systems and methods and associated devices and modules are susceptible to many variations. Additionally, for clarity and concision, many descriptions of the systems and methods have been simplified. For example, the figures generally illustrate one of each type of network device, but a network system may have many of each type of device.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art.

What is claimed is:

1. A method of managing data traffic offload from a radio access network, the method comprising, by at least one hardware processor of a server:
obtaining an offload profile for at least one cellular sector in a cellular network, wherein the offload profile indicates a target traffic capacity for at least one time period; and,
during the at least one time period, performing offload management based on the offload profile by
determining how much traffic capacity from alternative networks, different from the cellular network, is needed to satisfy the target traffic capacity for the at least one time period,
for each of one or more mobile devices within the cellular sector,
determining a location of the mobile device, and
identifying one or more alternative networks available to the mobile device at the determined location,
when more traffic capacity is determined to be needed from alternative networks, initiating an offloading of at least one of the one or more mobile devices to at least one of the one or more alternative networks available to that at least one mobile device, and,
when less traffic capacity is determined to be needed from alternative networks, initiating a disconnection of at least one of the one or more mobile devices from at least one of the one or more alternative networks available to that at least one mobile device.

2. The method of claim 1, wherein, for each of the one or more mobile devices, the one or more alternative networks available to the mobile device are identified based, at least in part, on at least one of a relative signal strength indication (RSSI), an encoding method selected by the mobile device, and an encoding method selected by an access point of at least one alternative network.

3. The method of claim 1, further comprising receiving an actual data usage on an alternative network from software applications executing on each mobile device that is offloaded to an alternative network.

4. The method of claim 1, wherein obtaining the offload profile comprises determining the target traffic capacity for the at least one time period based on actual traffic from a previous time period that precedes the at least one time period.

5. The method of claim 1, wherein the server is a cloud-based server.

6. The method of claim 1, wherein the method is performed for each of a plurality of cellular sectors in the cellular network.

7. The method of claim 1, wherein the offload profile indicates a target traffic capacity for each of a plurality of time periods, and wherein the offload management is performed for each of the plurality of time periods.

8. The method of claim 1, wherein the target traffic capacity comprises a data capacity.

9. The method of claim 1, wherein the target traffic capacity comprises a number of active mobile devices.

10. A system for managing data traffic offload from a radio access network, the system comprising:
at least one hardware processor; and
one or more software modules configured to, when executed by the at least one hardware processor,
obtain an offload profile for at least one cellular sector in a cellular network, wherein the offload profile indicates a target traffic capacity for at least one time period, and,
during the at least one time period,
determine how much traffic capacity from alternative networks, different from the cellular network, is needed to satisfy the target traffic capacity for the at least one time period,
for each of one or more mobile devices within the cellular sector,
determine a location of the mobile device, and
identify one or more alternative networks available to the mobile device at the determined location,
when more traffic capacity is determined to be needed from alternative networks, initiating an offloading of at least one of the one or more mobile devices to at least one of the one or more alternative networks available to that at least one mobile device, and,
when less traffic capacity is determined to be needed from alternative networks, initiating a disconnection of at least one of the one or more mobile devices from at least one of the one or more alternative networks available to that at least one mobile device.

11. The system of claim 10, wherein the one or more modules are further configured to, for each of the one or more mobile devices within the cellular sector, receive a result of a scan for available network access points around the location of the mobile device from the mobile device.

12. The system of claim 11, wherein, for each of the one or more mobile devices within the cellular sector, the identification of one or more alternative networks available to the mobile device is based, at least in part, on the result of the scan received from that mobile device.

13. The system of claim 12, wherein initiating an offloading of at least one mobile device to at least one alternative network available to that at least one mobile device comprises sending, via the cellular network, an identification of an access point of the at least one alternative network, to which the at least one mobile device should connect, to the at least one mobile device.

14. The system of claim 13, wherein sending an identification of an access point of the at least one alternative network to the at least one mobile device comprises sending a rank-ordered list of access points of a plurality of alternative networks available to the at least one mobile device.

15. The system of claim 10, further comprising a software application executing on each of the one or more mobile devices, wherein the software application is configured to, when executed by at least one hardware processor of a mobile device that has been offloaded to an alternative network:
monitor a quality of a signal of an access point for the alternative network to which the mobile device has been offloaded; and
in response to the quality decreasing below a threshold during a connection to the alternative network to which the mobile device has been offloaded, disconnect the mobile device from the access point, and connect to the cellular network.

16. The system of claim 10, wherein the one or more software modules are further configured to receive an actual data usage on an alternative network from software applications executing on each mobile device that is offloaded to an alternative network.

\* \* \* \* \*